United States Patent
Muninder et al.

(10) Patent No.: US 9,609,176 B2
(45) Date of Patent: Mar. 28, 2017

(54) METHOD AND APPARATUS FOR MODIFYING A MULTI-FRAME IMAGE BASED UPON ANCHOR FRAMES

(71) Applicant: Nokia Technologies OY, Espoo (FI)

(72) Inventors: Veldandi Muninder, San Jose, CA (US); Daniel Vaquero, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 7 days.

(21) Appl. No.: 14/837,061

(22) Filed: Aug. 27, 2015

(65) Prior Publication Data

US 2017/0064148 A1  Mar. 2, 2017

(51) Int. Cl.
  *G06K 9/00* (2006.01)
  *H04N 1/60* (2006.01)
  *H04N 5/232* (2006.01)
  *G06K 9/62* (2006.01)
  *G06T 11/60* (2006.01)

(52) U.S. Cl.
  CPC ......... *H04N 1/6027* (2013.01); *G06K 9/6218* (2013.01); *G06K 9/6267* (2013.01); *G06T 11/60* (2013.01); *H04N 5/23238* (2013.01)

(58) Field of Classification Search
  CPC . G06T 3/40383; G06T 11/60; H04N 5/23238; H04N 1/6027; G06K 9/6218; G06K 9/6267
  See application file for complete search history.

(56) References Cited

U.S. PATENT DOCUMENTS

| 8,319,861 | B2 | 11/2012 | Chen et al. |
| 2002/0036649 | A1 | 3/2002 | Kim et al. |
| 2003/0103670 | A1* | 6/2003 | Schoelkopf ........... G06T 11/001 382/162 |
| 2004/0109078 | A1* | 6/2004 | Artonne ............... H04N 1/6033 348/335 |

(Continued)

OTHER PUBLICATIONS

Darabi et al. "Image Melding: Combining Inconsistent Images Using Patch-based Synthesis", ACM Transactions on Graphics (TOG) vol. 31, No. 4, Article 82, Jul. 2012.

(Continued)

*Primary Examiner* — Sean Motsinger
(74) *Attorney, Agent, or Firm* — Alston & Bird LLP

(57) ABSTRACT

A method, apparatus and computer program product are provided to cause image content to be adjusted in a manner consistent with the corresponding viewing direction, such as the viewing direction of a user of a head-mounted display device. In regards to a method, one or more first anchor frames are determined within a multi-frame image, a user's viewing direction is determined relative to the multi-frame image and at least one second anchor frame is identified based on the user's viewing direction. The method also includes determining one or more tonal modification parameters of a frame in relation to the viewing direction based upon the one or more first anchor frames and the at least one second anchor frame. Further, the method generates a plurality of modified frames based on the one or more tonal modification parameters. A corresponding apparatus and computer program product are also provided.

20 Claims, 5 Drawing Sheets

(56) References Cited

U.S. PATENT DOCUMENTS

| | | | |
|---|---|---|---|
| 2006/0250505 A1* | 11/2006 | Gennetten | H04N 5/23212 348/218.1 |
| 2006/0274170 A1* | 12/2006 | Azuma | H04N 5/23238 348/246 |
| 2008/0225132 A1* | 9/2008 | Inaguma | H04N 5/247 348/222.1 |
| 2009/0091654 A1* | 4/2009 | Nakamura | H04N 1/2166 348/469 |
| 2010/0149338 A1* | 6/2010 | Aggarwal | H04N 5/2258 348/159 |
| 2011/0148863 A1 | 6/2011 | Seo et al. | |
| 2011/0273466 A1 | 11/2011 | Imai et al. | |
| 2011/0293175 A1* | 12/2011 | Yoon | H04N 5/23238 382/165 |
| 2012/0105574 A1 | 5/2012 | Baker et al. | |
| 2012/0200665 A1* | 8/2012 | Furumura | G06T 3/0062 348/36 |
| 2013/0089301 A1* | 4/2013 | Ju | H04N 5/91 386/241 |
| 2014/0147043 A1* | 5/2014 | Muninder | G06T 7/0028 382/167 |
| 2014/0176757 A1* | 6/2014 | Rivard | H04N 5/2354 348/223.1 |
| 2014/0300767 A1 | 10/2014 | Lischinski et al. | |
| 2015/0054913 A1* | 2/2015 | Annau | G11B 27/11 348/36 |
| 2015/0131909 A1* | 5/2015 | Muninder | G06T 3/4038 382/192 |
| 2015/0172615 A1* | 6/2015 | Tanaka | H04N 9/045 348/242 |
| 2015/0222799 A1* | 8/2015 | Noorkami | H04N 5/2352 348/223.1 |

OTHER PUBLICATIONS

Farbman et al. "Tonal Stabilization of Video" ACM SIGGRAPH 2011 Papers, Article No. 89 [online] [retrieved Dec. 22, 2015] <URL: http://www.cs.huji.ac.il/labs/cglab/projects/tonestab/>.

Frigo et al. "Motion Driven Tonal Stabilization", Jun. 19, 2015 (v2) [online] [retrieved Dec. 22, 2015] <URL: https://hal.archives-ouvertes.fr/hal-01150558v2>.

Simon et al. "Video Tonal Stabilization with Automatic Multiple Anchor Frames", 18th IEEE International Symposium on Consumer Electronics, ISCE 2014.

Wang et al. "Video Tonal Stabilization via Color States Smoothing", IEEE Transactions of Image Processing, vol. 23, No. 11, Nov. 2014.

Xiong et al. "Color Matching of Images Sequences with Combined Gamma and Linear Corrections", International Conference on ACM Multimedia 2010, Oct. 25-29, 2010; Firenze, Italy.

Xiong et al. "Fast Image Stitching and Editing for Panorama Painting on Mobile Phones", IEEE Computer Society Conference on Computer Vision and Pattern Recognition Workshops, Jun. 13-18, 2010, pp. 47-52.

International Search Report and Written Opinion for corresponding International Application No. PCT/IB2016/055018, dated Dec. 16, 2016.

Simon et al., *Quality Enhancement for Feature Matching on Car Black Box Videos*, Signal and Information Processing Association Annual Summit and Conference (APSIPA), 2014 Asia-Pacific, 4 pages.

* cited by examiner

METHOD AND APPARATUS FOR MODIFYING A MULTI-FRAME IMAGE BASED UPON ANCHOR FRAMES

TECHNOLOGICAL FIELD

An example embodiment relates generally to modifying content and, more particularly, to a method and apparatus for modifying a multi-frame image based upon anchor frames identified therewithin.

BACKGROUND

Panoramic images may be generated for various purposes. In addition to the panoramic images created for personal enjoyment, such as the panoramic images of a vacation destination, a scenic location or an event, panoramic images may be utilized by video games or by other visually immersive technology including virtual reality or augmented reality applications. While panoramic images may be presented in various manners, head-mounted display headsets, stereoscopic goggles, smartphones, portable video game players and or the like may be configured to display panoramic images.

Panoramic images may be generated from multiple images captured from different viewing directions that are combined and stitched together to form the panoramic image. Because of the combination of multiple individual images to form the panoramic image, the panoramic image may not appear uniform and, instead, the different image properties of the individual images may cause the individual images that comprise the panoramic image to be readily distinguishable. As such, image modification systems have been developed for global tonal correcting of all images that comprise a panoramic image. While useful for blending the individual images of a panoramic image, these systems tend to reduce or eliminate localized variations in the image parameters, which exist in the real world and would be desirably maintained in the panoramic image, however, provide uneven tonal fluctuation and visible visual seams due to different tonal.

BRIEF SUMMARY

A method, apparatus and computer program product are provided in accordance with an example embodiment in order to modify the frames of a multi-frame image, such as a panoramic image, in order to blend the frames while preserving at least some degree of localized variations in the image parameters. As such, the image parameters of the subset of frames of the panoramic image that are viewed by a user may be modifying based on a more localized set of image parameters, thereby serving to blend the frames while preserving a localized variation. As such, the viewing experience may be enhanced due to the localized variation, such as when applied to the context of head-mounted display devices as at any instant the user may view only local content which is a subset of a 360° view.

In an example embodiment, a method is provided that includes determining one or more first anchor frames within a multi-frame image. A method of this example embodiment also includes determining a user's viewing direction relative to the multi-frame image. The method of this example embodiment also includes identifying at least one second anchor frame based on the user's viewing direction. The method of this example embodiment also includes determining one or more tonal modification parameters of a frame in relation to the viewing direction based upon the one or more first anchor frames and the at least one second anchor frame. As such, the image content, such as a plurality of modified frames, may be generated based on the one or more tonal modification parameters.

The method of an example embodiment may determine the one or more first anchor frames within a multi-frame image by receiving a plurality of images and by classifying the plurality of images into a plurality of subsets based on similarities in one or more image properties. The method of an example embodiment may also include classifying the plurality of images into a plurality of subsets by analyzing a plurality of color correction matrices or a plurality of automatic white balance parameters defined by the plurality of images; by clustering the plurality of images into the plurality of subsets based on the plurality of color correction matrices or the plurality of automatic white balance parameters and by identifying a respective image from each cluster to be a first anchor frame. In an example embodiment, the generation of the plurality of modified frames based on the one or more tonal modification parameters comprises causing the plurality of corrected frames to be displayed by a head-mounted display device.

The method of an example embodiment may receive the plurality of images by receiving one or more images captured from multiple directions with respect to a predefined focal point, and combining the multiple images to form the multi-frame image in the form of a panoramic image, wherein the one or more first anchor frames and the at least one second anchor frame are different images of the multi-frame image. The method of an example embodiment may also include defining a viewing direction range based on the user's viewing direction, selecting the at least one second anchor frame located within the viewing direction range, and selecting at least one first anchor frame outside of and on each of the opposed sides of the viewing direction range. In an example embodiment, the method may select the at least one second anchor frame located within the viewing direction range by selecting the at least one second anchor frame in a central portion of the viewing direction range. The method of an example embodiment may determine the one or more tonal modification parameters by determining one or more tonal modification parameters for a respective frame within the viewing direction range based upon the at least one second anchor frame within the viewing direction range and the first anchor frame outside of the viewing direction range and on an opposite side of the respective frame from the at least one second anchor frame. In an example embodiment, the method may compute the plurality of tonal modification parameters associated with the viewing direction by dynamically assigning a plurality of weight contribution factors to each of the first and the second plurality of anchor frames, respectively.

In another example embodiment, an apparatus is provided that includes at least one processor and at least one memory including computer program code with the at least one memory and the computer program code configured to, with the processor, cause the apparatus to determine one or more first anchor frames within a multi-frame image and to determine a user's viewing direction relative to the multi-frame image. The at least one memory and the computer program code are also configured to, with the processor, cause the apparatus of this example embodiment to identify at least one second anchor frame based on the user's viewing direction. For example, one or more tonal modification parameters of a frame in relation to the viewing direction may be determined based upon the one or more first anchor frames and the at least one second anchor frame. The at least one memory and the computer program code are also configured to, with the processor, cause the apparatus of this example embodiment to generate a plurality of modified frames based on the one or more tonal modification parameters.

The at least one memory and the computer program code may also be configured to, with the processor, cause the apparatus of an example embodiment to determine the one or more first anchor frames within a multi-frame image by receiving a plurality of images and by classifying the plurality of images into a plurality of subsets based on similarities in one or more image properties. The at least one memory and the computer program code may also be configured to, with the processor, cause the apparatus of an example embodiment to generate the plurality of modified frames based on the one or more tonal modification parameters by causing the plurality of corrected frames to be displayed by a head-mounted display device. In an example embodiment, the at least one memory and the computer program code may also be configured to, with the processor, cause the apparatus to define a viewing direction range based on the user's viewing direction, select the at least one second anchor frame located within the viewing direction range and select at least one first anchor frame outside of and on each of the opposed sides of the viewing direction range. In an example embodiment, the at least one memory and the computer program code may also be configured to, with the processor, cause the apparatus to determine the one or more tonal modification parameters by determining one or more tonal modification parameters for a respective frame within the viewing direction range based upon the at least one second anchor frame within the viewing direction range and the first anchor frame outside of the viewing direction range and on an opposite side of the respective frame from the at least one second anchor frame. In an example embodiment, the at least one memory and the computer program code may also be configured to, with the processor, cause the apparatus to compute the plurality of tonal modification parameters associated with the viewing direction by dynamically assigning a plurality of weight contribution factors to each of the first and the second plurality of anchor frames, respectively.

In a further example embodiment, a computer program product is provided that includes at least one non-transitory computer-readable storage medium having computer-executable program code portions stored therein with the computer-executable program code portions including program code instructions for determining one or more first anchor frames within a multi-frame image and for determining a user's viewing direction relative to the multi-frame image. The computer-executable program code portions of this example embodiment also include program code instructions for identifying at least one second anchor frame based on the user's viewing direction. The computer-executable program code portions of this example embodiment also include program code instructions for determining one or more tonal modification parameters of a frame in relation to the viewing direction based upon the one or more first anchor frames and the at least one second anchor frame and generating a plurality of modified frames based on the one or more tonal modification parameters.

In an example embodiment, the program code instructions for determining the one or more first anchor frames within a multi-frame image may include program code instructions for receiving a plurality of images and classifying the plurality of images into a plurality of subsets based on similarities in one or more image properties.

The computer-executable program code portions of an example embodiment may also include program code instructions for defining a viewing direction range based on the user's viewing direction and selecting the at least one second anchor frame located within the viewing direction range. The computer-executable program code portions of this example embodiment also include program code instructions for selecting at least one first anchor frame outside of and on each of the opposed sides of the viewing direction range. In an example embodiment, the program code instructions for determining the one or more tonal modification parameters include program code instructions for determining one or more tonal modification parameters for a respective frame within the viewing direction range based upon the at least one second anchor frame within the viewing direction range and the first anchor frame outside of the viewing direction range and on an opposite side of the respective frame from the at least one second anchor frame. In an alternative embodiment, the program code instructions for computing the plurality of tonal modification parameters associated with the viewing direction may include program code instructions for dynamically assigning a plurality of weight contribution factors to each of the first and the second plurality of anchor frames, respectively.

In yet another example embodiment, an apparatus is provided that includes means for determining one or more first anchor frames within a multi-frame image. An apparatus of this example embodiment also includes means for determining a user's viewing direction relative to the multi-frame image. The apparatus of this example embodiment also includes means for identifying at least one second anchor frame based on the user's viewing direction. The apparatus of this example embodiment also includes means for determining one or more tonal modification parameters of a frame in relation to the viewing direction based upon the one or more first anchor frames and the at least one second anchor frame. As such, the image content, such as a plurality of modified frames, may be generated based on the one or more tonal modification parameters.

BRIEF DESCRIPTION OF THE DRAWINGS

Figure 1:
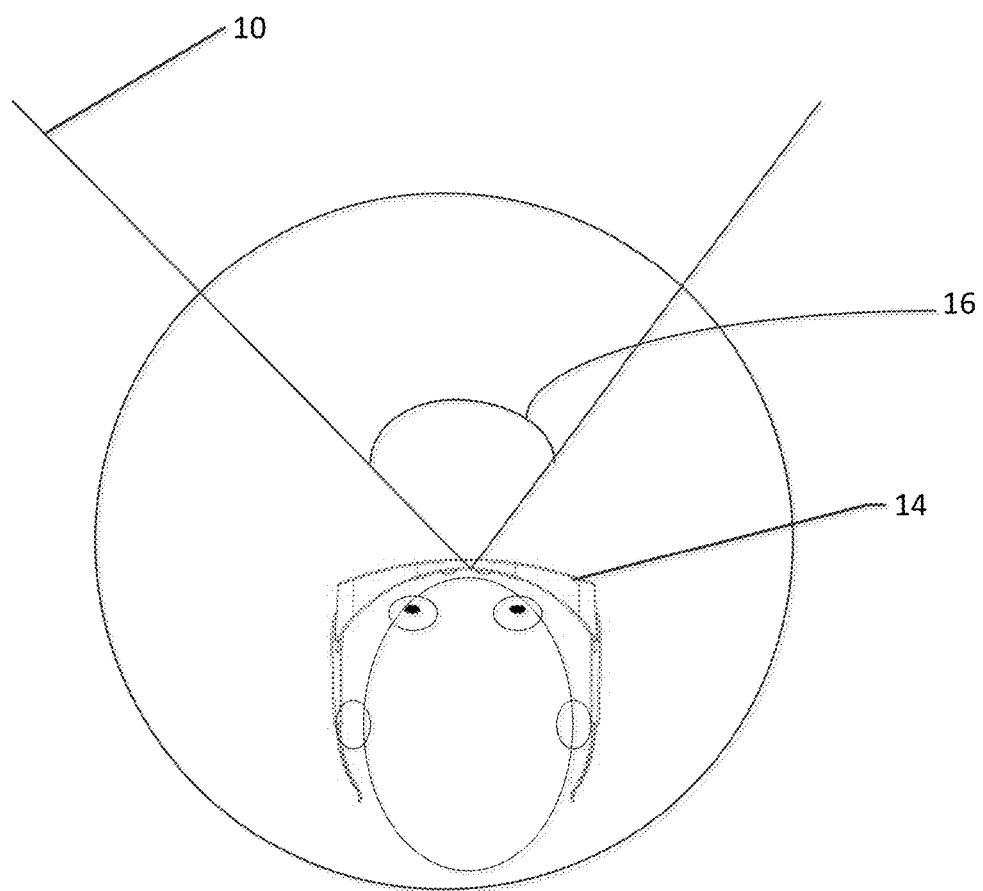
Figure 2:
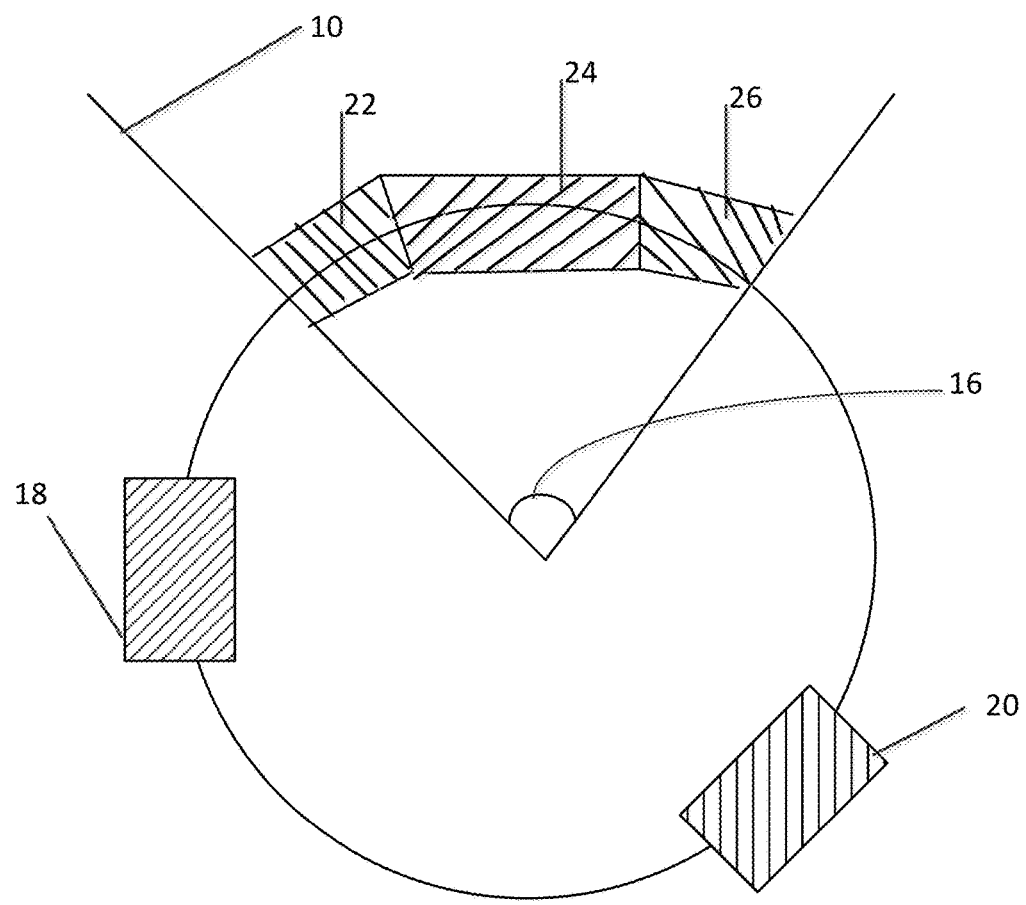
Figure 3:
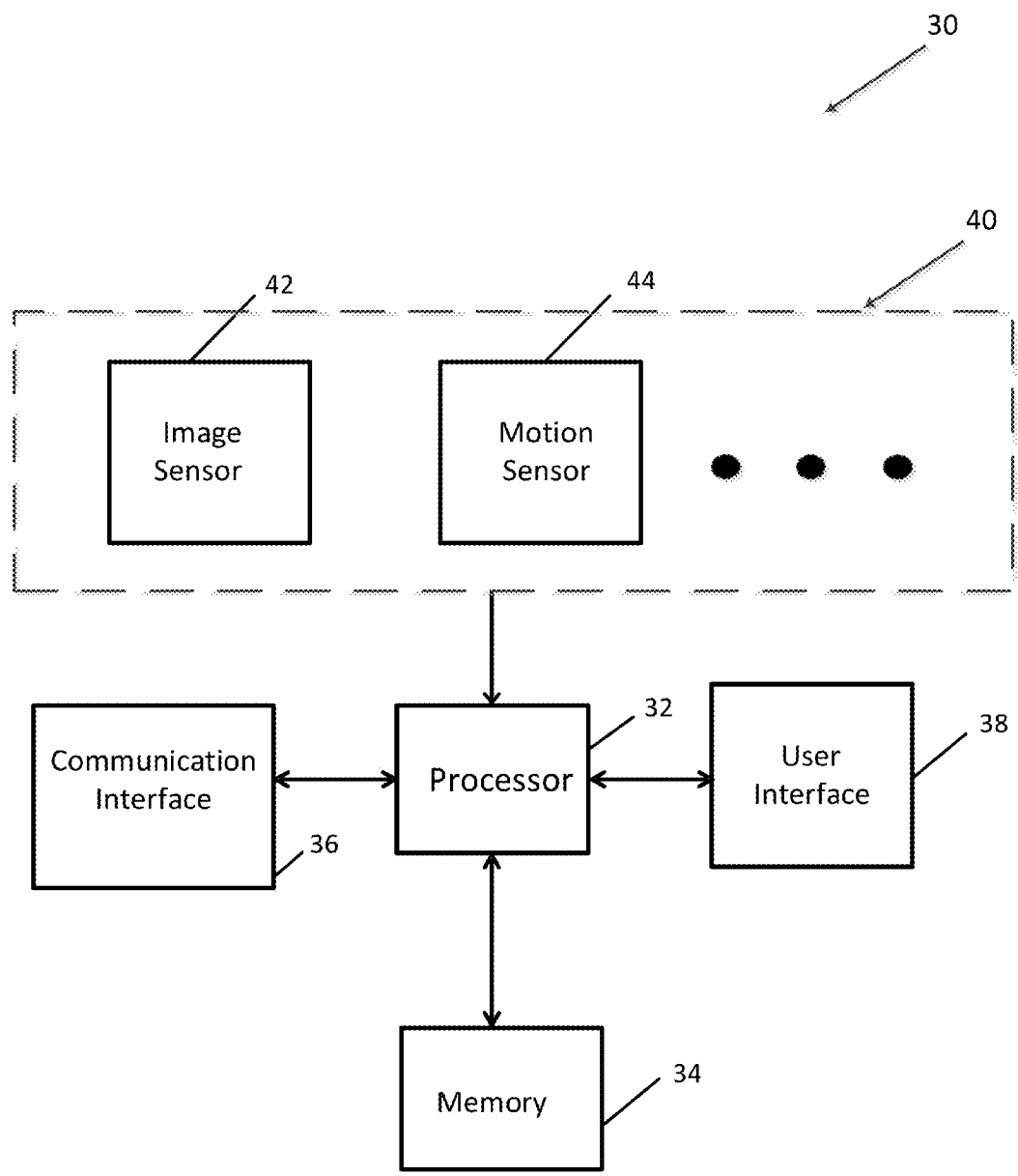
Figure 4:
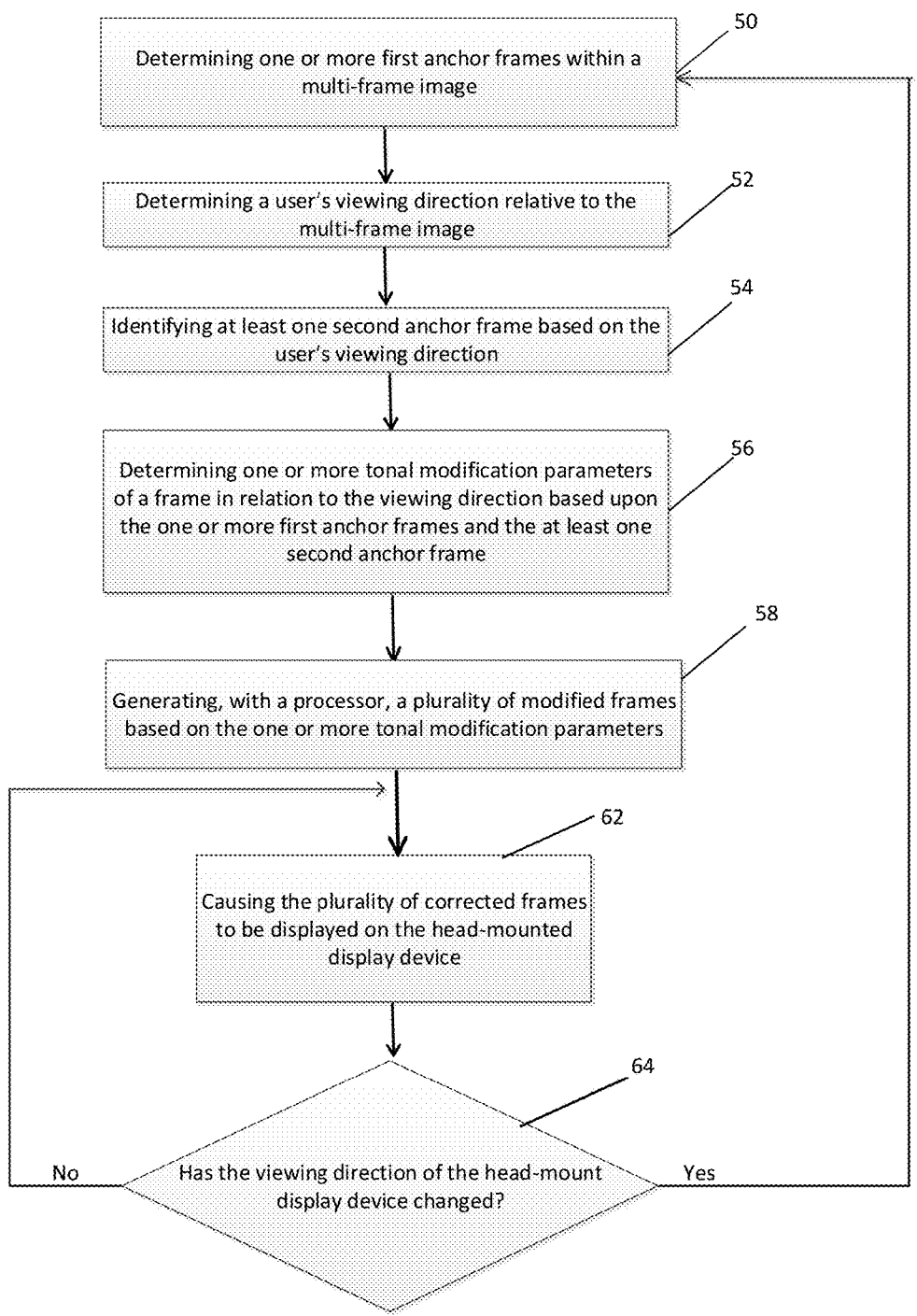
Figure 5:
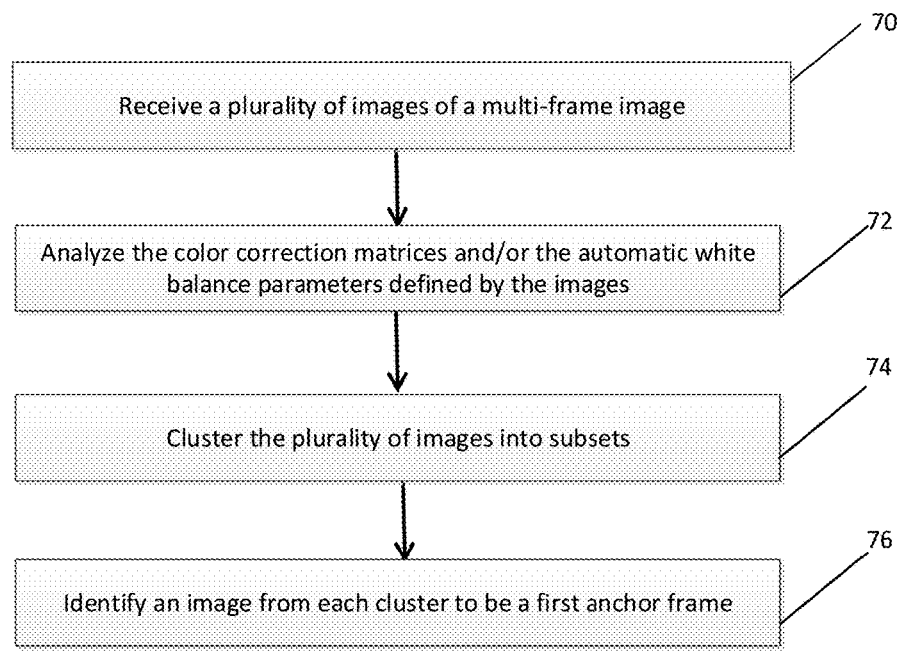

Having thus described certain embodiments of the invention in general terms, reference will now be made to the accompanying drawings, which are not necessarily drawn to scale, and wherein:

FIG. 1 depicts a viewing direction range within a panoramic image as utilized in conjunction with image modification in accordance with an example embodiment of the present invention;

FIG. 2 depicts a diagram of anchor frames with respect to the viewing direction in accordance with an example embodiment of the present invention;

FIG. 3 illustrates a simplified block diagram of an apparatus that may be specifically configured in accordance with an example embodiment of the present invention;

FIG. 4 is a flowchart illustrating operations performed, such as by the apparatus of FIG. 3, in accordance with an example embodiment of the present invention; and FIG. 5 is a flowchart illustrating operations performed, such as by the apparatus of FIG. 3, in order to determine one or more first anchor frames in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus 30 and a computer program product are provided in accordance with an example embodiment in order to generate modified image content in relation to the viewing direction 10 at which a multi-frame image, such as a panoramic image, is viewed. As such, the method, apparatus and computer program product of an example embodiment permit the identification of one or more anchor frames and tonal modification parameters based on the viewing direction 10. In this regard, by monitoring the viewing direction of a user, the method, apparatus and computer program product of an example embodiment provide for the image content to be modified and displayed in correspondence with within the current viewing direction 10, thereby permitting the frames of a multi-frame image to be blended while still preserving a localized set of image parameters. Thus, the resulting user experience may be enhanced by tonal modification of a multi-frame image, such as a panoramic image, in accordance with the example embodiment of the present invention.

A multi-frame image may be formed by combining and stitching a plurality of single images together. Each image may have been captured in and associated with a different direction such that by combining a plurality of individual images, a larger multi-frame image spanning a larger angular range is created. In the embodiment of FIG. 1, the multi-frame image extends 360° about a viewer so as to be a panoramic image. The multi-frame image may be a single static image or the multi-frame image may be one of a plurality of multi-frame images that comprise a video image.

By way of example, FIG. 1 depicts the user, such as a viewer, of the panoramic image. The user in this example may be positioned at the center of the panoramic image and, in one example embodiment, may wear a head-mounted display device 14 having a screen for displaying, such as by presenting, different portions of the panoramic image depending upon the direction in which the user is looking. The individual images that comprise a multi-frame image are captured from various directions and, as such, are different from one another. The content of the images may include, for example, a two-dimensional (2D) representation, a 3D representation and/or a stereoscopic representation. Additionally, some image content may include a perspective projection, a diametric projection, and/or an orthographic projection. In some embodiments, the image content from different potential viewing directions may be captured and pre-calibrated, such as in terms of tonal modification parameters as described below, to increase the processing speed during subsequent viewing of the multi-frame images, such as in various virtual reality or other applications. In alternative embodiments, the image content may be captured and stored, but only processed at the time the user looks in a certain direction such that the viewing direction range is defined.

As noted above, a user may view a multi-frame image in various manners including, for example, via a head-mounted display device 14. In this example embodiment, the head-mounted display includes a display that is head-mounted, such that both the orientation and the trajectory of the image content remain in correspondence, even as the head-mounted display device 14 that includes the display is tilted. As shown in FIG. 1, for example, the user, such as a user wearing a head-mounted display, may have an angular range 16 centered about the viewing direction 10, such as 30°, within a horizontal plane. In an example embodiment, the angular range 16 may be predefined, such as for certain head-mounted display devices 14. In another embodiment, the angular range 16 may be adjustable by the user, such as depending on the application of the multi-frame image. For example, an angular range may be adjustable by the user between 30°-90° for a virtual city tour application, an angular range may be adjustable by the user between 20°-40° for a virtual interview meeting application or an angular range may be adjustable between 60°-180° for a virtual military training application.

In order to define the tonal modification parameters in accordance with an example embodiment of the present application, a plurality of anchor frames are identified. By way of example, FIG. 2 depicts a structural diagram of anchor frames within a panoramic image that comprises a plurality of frames stitched together with respect to the viewing direction 10. As noted above, a viewing direction range is defined about a viewing direction and within a viewing direction range, a first variable anchor frame 24 at or proximate to the viewing direction 10 is selected. In addition to a variable anchor frame, the plurality of anchor frames may include one or more fixed anchor frames, each of which is representative of a different subset of the frames. As described below, each subset of frames is identified based on similarities in one or more image properties of the frames of the subset, such as attributable to the frames of the subset being illuminated by the same illuminant(s). The frames from the same subset may be physically contiguous. In one embodiment, a first fixed anchor frame 18 and a second fixed anchor frame 20 are selected from first and second subsets, respectively, of the multi-frame image. The first and second anchor frames are located outside of and on each of the opposed sides of the viewing direction range 16. As also described below, a frame 22 within the viewing direction range and between the first fixed anchor frame and the first variable anchor frame may then be modified based upon tonal modification parameters by blending the parameters of both the first fixed anchor frame 18 and first variable anchor frame 24. Similarly, a frame 26 within the viewing direction range and between the second fixed anchor frame and the first variable anchor frame may be modified based upon tonal modification parameters by blending both the parameters of the second fixed anchor frame 20 and first variable anchor frame 24. As these examples illustrate, tonal modification parameters may be generated for each frame within the viewing direction range based upon the image parameters of the anchor frames (a variable anchor frame and a fixed anchor frame) located on opposite sides of the respective frame. The relative contributions of the image parameters of the anchor frames to the tonal modification parameters may be defined in various manners, such as in accordance with a weight contribution factor associated with each anchor frame. For example, the tonal modification parameters for frame 22 may be generated by assigning a weight contribution factor of 50% to the first fixed anchor frame 18 and a weight contribution factor of 50% to the first variable anchor frame 24. Similarly, the tonal modification parameters for the frame 26 may be generated by assigning a weight contribution factor of 20% to the second fixed anchor frame 20 and a weight contribution factor of 80% to the first variable anchor frame 24. In instances in which the speed or acceleration of the user's head changes, such as defined in an example embodiment by the moving speed of the head-mounted display device 14, the weight contribution factors will be reassigned or regenerated accordingly based upon the moving speed.

FIG. 3 is a simplified block diagram of a computing device that embodies the apparatus. The apparatus 30 may include or otherwise be associated with or is otherwise in communication with a processor 32, a memory device 34 and a communication interface 36. In an embodiment in which the apparatus is embodied by portable display devices, such as a head-mounted display device, the apparatus may also include, be associated with or otherwise be in communication with a user interface 38, a sensor module 40 (such as an image sensor 42, a motion sensor 44, and/or the like). Alternative embodiments may add, omit, separate, and/or combine components, depending on desired functionality. A person of ordinary skill in the art will recognize many variations.

The apparatus 30 of an example embodiment may be embodied by a variety of different types of computing devices. For example, the apparatus may be embodied by a portable display device, such as head-mounted display, stereoscopic goggles or glasses, a stereoscopic helmet, personal digital assistant (PDA), mobile telephone, smart phone, companion device, gaming device, laptop computer, camera, tablet computer, touch surface or any combination of the aforementioned, and other types of image and video communications systems. Alternatively, the computing device may be a fixed computing device, such as a personal computer, a desktop computer, a computer workstation, a server, a simulator or the like, that communicates with a display device 14 carried by a user so as to receive information regarding the viewing direction and, in some embodiments, the speed with which the user's head is moving, and to provide tonal modified image content for presentation by the display device 14.

Regardless of the manner in which the apparatus 30 is embodied, the apparatus of an example embodiment is depicted in FIG. 3. The apparatus may include, be associated with or otherwise in communication with a processor 32 and a memory device 34, and optionally a communication interface 36 and a user interface 38. In some embodiments, the processor 32 (and/or co-processors or any other processing circuitry assisting or otherwise associated with the processor) may be in communication with the memory device 34 via a bus for passing information among components of the apparatus 30. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 30 of an example embodiment may also optionally include or otherwise be in communication with a user interface 38. The user interface 38 may include a display, a touch screen display, a keyboard, a mouse, or other input/output mechanisms. In some embodiments, the user interface may also be configured to provide output to the user. In this example embodiment, the processor 32 may comprise circuitry of the user interface 38 configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 34, and/or the like).

The apparatus 30 of the illustrated embodiment may also optionally include a communication interface 36 that may be any means such as a device or circuitry embodied in either hardware or a combination of hardware and software that is configured to receive and/or transmit data from/to other electronic devices, such as the sensor module 40, in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The sensor module of or associated with the apparatus 30 may also include one or more of the image sensor 42, the motion sensor 44 and/or the like. The image sensor may be embodied in various manners so as to capture multiple images in different directions. For example, the image sensor may be embodied by a 360-degree camera or a camera rotating at a certain speed to capture a panoramic image, video and/or spatial audio. However, the image sensor may be embodied in other manners in other embodiments.

With respect to the motion sensor 44, the motion sensor may provide for motion detection in the form of a speed sensor and/or other means of capturing movement in order to capture the speed of the head movement of the user. In addition, the motion sensor 44 may also comprise an orientation sensor embodied in various manners so as to determine the orientation of the user's head. For example, the orientation sensor may be embodied by a magnetometer, an accelerometer, a gyroscope or the like. In an example embodiment in which the apparatus is embodied by or associated with a head-mounted display device 14, the head-mounted display may include the image sensor and the motion sensor.

Referring now to FIG. 4, the operations performed, such as by a specifically configured apparatus 30 of FIG. 3, are depicted. As shown in block 50, the apparatus 30 includes means, such as the processor 32 or the like, for determining one or more anchor frames within a multi-frame image, such as a panoramic image. Although the anchor frames may be determined for a multi-frame image that is stored in memory 34, the apparatus of an example embodiment may also include means, such as the processor 32, the memory 34 or the like, for receiving a plurality of images, such as the panoramic or other multi-frame image or multiple images captured from a common position, that is, a predefined focal point, but in different viewing directions. In an instance in which multiple images captured in different viewing directions are received, the apparatus may include means, such as the processor, for combining the multiple images to form the multi-frame image, such as a panoramic image, such as by stitching the images together based upon the different viewing directions associated with the images.

The anchor frames that are determined from the multi-frame image include at least one variable anchor frame that is dependent upon the viewing direction 10 and one or more fixed anchor frames. As shown in block 52, the apparatus 30 therefore also includes means, such as the sensor module 40, the processor 32 or the like, for determining the user's viewing direction 10 relative to the multi-frame image. The apparatus also includes means, such as the processor or the like, for determining an angular range centered about the current viewing direction 10 in order to define the viewing direction range, such as in the manner described above in which the range is predefined based upon the type of application with which the user is interacting.

In order to determine one or more fixed anchor frames (also known as first anchor frames), the apparatus 30 of an example embodiment includes means, such as the processor 32, the memory 34 or the like, for receiving a plurality of images (each of which is a frame of a multi-frame image) as shown in block 70 of FIG. 5 and as described above. The apparatus also includes means, such as the processor or the like, for classifying the plurality of images into a plurality of subsets based upon similarities in one or more image properties. The similarities in the image properties may be driven by the exposure of the various frames of the multi-frame image to different illuminants. For example, a first subset of frames of the multi-frame image may be primarily illuminated by a first light source, such as natural light through a first window, a second subset of frames of the multi-frame image may be primarily illuminated by a second light source, such as natural light through a second window and a third subset of frames of the multi-frame image may be primarily illuminated by a third light source, such as lamp. The images may be classified into different subsets in various manners. In one example embodiment, each image is associated with a color correction matrix and/or automatic white balance parameters. In this example embodiment, the apparatus 30 includes means, such as the processor or the like, for analyzing a plurality of the color correction matrices and/or the automatic white balance parameters defined by the plurality of images and means, such as the processor or the like, for clustering the plurality of images into the plurality of subsets based on the plurality of the color correction matrices and/or the automatic white balance parameters. See blocks 72 and 74 of FIG. 5. In this regard, the images may be clustered into subsets based upon similarities between the plurality of the color correction matrices and/or the automatic white balance parameters of the respective images. Additionally, the images clustered into a subset are generally adjacent one another so as to define a contiguous subset of images from the multi-frame image.

The apparatus 30 of this example embodiment also includes means, such as the processor 32 or the like, for identifying a respective image from each cluster to be a first anchor frame, that is, a fixed anchor frame. See block 76 of FIG. 5. The fixed anchor frame of a subset may be defined in various manners including, for example, anchor frame of the subset that has the median image parameters relative to the other images of the subset.

Based upon the user's viewing direction 10 in respect to the multi-frame image, the apparatus 30 of an example embodiment also includes means, such as the processor 32 or the like, for identifying at least one second anchor frame, that is, a variable anchor frame. Although the second anchor frame may be defined in various manners, the apparatus of an example embodiment includes means, such as the processor or the like, for selecting at least one second anchor frame located within the viewing direction range, such as in a central portion of the viewing direction range. For example, in an instance in which an odd number of frames are within the viewing direction range, the second anchor frame may be the centermost frame within the viewing direction range. Alternatively, in an instance in which an even number of frames are within the viewing direction range, the two centermost frames within the viewing direction range may be selected as the second anchor frames.

Once the viewing direction range has been defined, the apparatus 30 also includes means, such as the processor 32 or the like, for selecting at least one first anchor frame on each of the opposite sides of the viewing direction range. In an instance in which only a single first anchor frame exists in the multi-frame image, the single anchor frame is selected as the first anchor frame. However, in an instance in which two or more first anchor frames exist in the multi-frame image, two anchor frames are selected as the first anchor frames. For example, the anchor frames closest to the opposite sides of the viewing direction range may be selected as the first anchor frames.

The apparatus 30 of an example embodiment also includes means, such as the processor 32 or the like, for determining the tonal modification parameters for a respective frame within range of the viewing direction 10 based upon a combination of the at least one second anchor frame and the one or more first anchor frames, such as based upon a combination of the tonal modification parameters of these anchor frames. See block 56 of FIG. 4. In this regard, the tonal modification parameters for the frames within the viewing direction range that lie between the second anchor frame and one of the first anchor frames, such as the tonal modification parameters for frame 22 that lies between the second anchor frame 24 and first anchor frame 18, are based upon a combination of the tonal modification parameters of the second anchor frame and one of the first anchor frames. Similarly, the tonal modification parameters for the frames within the viewing direction range that lie between the second anchor frame and the other one of the first anchor frames, such as the tonal modification parameters for frame 26 that lies between the second anchor frame 24 and first anchor frame 20, are based upon a combination of the tonal modification parameters of the second anchor frame and the other one of the first anchor frames.

Various tonal modification parameters may be determined including, for example, modification parameters selected from a color correction, an automatic white balancing or an exposure fluctuation modification. Regardless of the type of tonal modification parameter, the tonal modification parameters of the frames within the viewing direction range may, in an example embodiment, be defined based upon an average of the tonal modification parameters of the at least one second anchor frame and the one or more first anchor frames. Additionally or alternatively, the apparatus, such as the processor, may be configured to dynamically assign a plurality of weight contribution factors to each of the variable and fixed anchor frames, respectively, with the tonal modification parameters of the frames within the viewing direction range being defined, in this example embodiment, based upon a weighted average of the tonal modification parameters of the at least one second anchor frame and the one or more first anchor frames. The weight contribution factors may be defined in various manners and, in an example embodiment, are defined based upon the direction and speed with which the user's head is turning with the anchor frame in the direction in which the user's head is turning being weighted more greatly than the other anchor frame and with the differential in the weighting varying in proportion to the speed such that the anchor frame in the direction in which the user's head is turning has a greater weight in an instance in which the user's head is turning at a greater speed than in an instance in which the user's head is turning at a slower speed. In an example embodiment, adjustment maps for each anchor frame may be determined and then utilized, such as in a weighted combination, to determine the tonal modification parameters. See Farbman, et al., *Tonal Stabilization of Video*, SIGGRAPH 2011 for a further discussion of the determination and application of adjustment maps of anchor frames.

The apparatus 30 also includes means, such as the processor 32 or the user interface 38, to generate a plurality of modified frames based on the one or more tonal modification parameters and, in one embodiment, causing the plurality of modified frames to be displayed on the head-mounted display 14. See also blocks 58 and 62 of FIG. 4. In this regard, the frames may be modified by applying the tonal modification parameters to the frames within the viewing direction range based upon the anchor frames as described above. Additionally or alternatively, the apparatus 30 of an example embodiment also includes means, such as the processor 32, the sensor module 40 or the like, for determining that the viewing direction 10 of the head-mounted display device 14 has changed to a different direction. See block 64 of FIG. 4. In this regard, as shown in blocks 50-58 of FIG. 4, the apparatus 30, such as the processor 32, of this example embodiment then repeats the process of receiving the image content information associated with the different viewing direction and generating the plurality of modified frames to be displayed, such as on the head-mounted display. As such, the image content presented to the user and the tonal modification information associated therewith changes as the viewing direction 10 and/or position of the head-mounted display device 14 change. Thus, the apparatus, including a head-mounted display device 14 associated therewith, can access and view a timely adjusted image content in response to the user looking at a new viewing direction.

FIGS. 4 and 5 illustrate flowcharts of an apparatus, method and computer program product according to example embodiments of the invention. It will be understood that each block of the flowcharts, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by a processor 32 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining one or more first anchor frames within a multi-frame image;
   determining a user's viewing direction relative to the multi-frame image;
   identifying at least one second anchor frame based on the user's viewing direction;
   determining one or more tonal modification parameters of a frame in relation to the viewing direction based upon the one or more first anchor frames and the at least one second anchor frame; and
   generating, with a processor, a plurality of modified frames based on the one or more tonal modification parameters.

2. A method according to claim 1 wherein determining the one or more first anchor frames within a multi-frame image comprises:
   receiving a plurality of images; and
   classifying the plurality of images into a plurality of subsets based on similarities in one or more image properties.

3. A method according to claim 2 wherein classifying the plurality of images into a plurality of subsets comprises:
   analyzing a plurality of color correction matrices or a plurality of automatic white balance parameters defined by the plurality of images;
   clustering the plurality of images into the plurality of subsets based on the plurality of color correction matrices or the plurality of automatic white balance parameters; and
   identifying a respective image from each cluster to be a first anchor frame.

4. A method according to claim 1 wherein generating the plurality of modified frames based on the one or more tonal modification parameters comprises causing the plurality of corrected frames to be displayed by a head-mounted display device.

5. A method according to claim 1 wherein receiving the plurality of images comprises:
   receiving one or more images captured in multiple directions with respect to a predefined focal point; and
   combining the multiple images to form the multi-frame image in the form of a panoramic image, wherein the one or more first anchor frames and the at least one second anchor frame are different images of the multi-frame image.

6. A method according to claim 1 further comprising:
   defining a viewing direction range based on the user's viewing direction; and
   selecting at least one first anchor frame on each of the opposed sides of the viewing direction range, wherein identifying at least one second anchor frame comprises selecting the at least one second anchor frame located within the viewing direction range.

7. A method according to claim 6 wherein selecting the at least one second anchor frame located within the viewing direction range comprises selecting the at least one second anchor frame in a central portion of the viewing direction range.

8. A method according to claim 6 wherein determining one or more tonal modification parameters comprises determining one or more tonal modification parameters for a respective frame within the viewing direction range based upon the at least one second anchor frame within the viewing direction range and the first anchor frame on an opposite side of the respective frame from the at least one second anchor frame.

9. A method according to claim 1 wherein computing the plurality of tonal modification parameters associated with the viewing direction comprises dynamically assigning a plurality of weight contribution factors to each of the first and the second plurality of anchor frames, respectively.

10. An apparatus comprising at least one processor and at least one memory including computer program code, the at least one memory and the computer program code configured to, with the processor, cause the apparatus to at least:
determine one or more first anchor frames within a multi-frame image;
determine a user's viewing direction relative to the multi-frame image;
identify at least one second anchor frame based on the user's viewing direction;
determine one or more tonal modification parameters of a frame in relation to the viewing direction based upon the one or more first anchor frames and the at least one second anchor frame; and
generate a plurality of modified frames based on the one or more tonal modification parameters.

11. An apparatus according to claim 10 wherein the at least one memory and the computer program code are configured to, with the processor, cause the apparatus to determine the one or more first anchor frames within a multi-frame image by:
receiving a plurality of images; and
classifying the plurality of images into a plurality of subsets based on similarities in one or more image properties.

12. An apparatus according to claim 10 wherein the at least one memory and the computer program code are configured to, with the processor, cause the apparatus to generate the plurality of modified frames based on the one or more tonal modification parameters by causing the plurality of corrected frames to be displayed by a head-mounted display device.

13. An apparatus according to claim 10 wherein the at least one memory and the computer program code are further configured to, with the processor, cause the apparatus to:
define a viewing direction range based on the user's viewing direction; and
select at least one first anchor frame on each of the opposed side of the viewing direction range, wherein the apparatus is caused to identify at least one second anchor frame by selecting the at least one second anchor frame located within the viewing direction range.

14. An apparatus according to claim 13 wherein determine one or more tonal modification parameters by determining one or more tonal modification parameters for a respective frame within the viewing direction range based upon the at least one second anchor frame within the viewing direction range and the first anchor frame on an opposite side of the respective frame from the at least one second anchor frame.

15. An apparatus according to claim 10 wherein the at least one memory and the computer program code are further configured to, with the processor, cause the apparatus to compute the plurality of tonal modification parameters associated with the viewing direction by dynamically assigning a plurality of weight contribution factors to each of the first and the second plurality of anchor frames, respectively.

16. A computer program product comprising at least one non-transitory computer-readable storage medium having computer-executable program code portions stored therein, the computer-executable program code portions comprising program code instructions for:
determining one or more first anchor frames within a multi-frame image based on a plurality of illuminants;
determining a user's viewing direction relative to the multi-frame image;
identifying at least one second anchor frame based on the user's viewing direction;
determining one or more tonal modification parameters of a frame in relation to the viewing direction based upon the one or more first anchor frames and the at least one second anchor frame; and
generating a plurality of modified frames based on the one or more tonal modification parameters.

17. A computer program product according to claim 16 wherein the program code instructions for determining the one or more first anchor frames within a multi-frame image comprise program code instructions for:
receiving a plurality of images; and
classifying the plurality of images into a plurality of subsets based on similarities in one or more image properties.

18. A computer program product according to claim 16 wherein the computer-executable program code portions further comprise program code instructions for:
defining a viewing direction range based on the user's viewing direction; and
selecting at least one first anchor frame on each of the opposed side of the viewing direction range, wherein identifying at least one second anchor frame comprises selecting the at least one second anchor frame located within the viewing direction range.

19. A computer program product according to claim 18 wherein the program code instructions for determining one or more tonal modification parameters comprise program code instructions for determining one or more tonal modification parameters for a respective frame within the viewing direction range based upon the at least one second anchor frame within the viewing direction range and the first anchor frame on an opposite side of the respective frame from the at least one second anchor frame.

20. A computer program product according to claim 16 wherein the program code instructions further comprise program code instructions for computing the plurality of tonal modification parameters associated with the viewing direction by dynamically assigning a plurality of weight contribution factors to each of the first and the second plurality of anchor frames respectively.

* * * * *

UNITED STATES PATENT AND TRADEMARK OFFICE
CERTIFICATE OF CORRECTION

PATENT NO. : 9,609,176 B2  
APPLICATION NO. : 14/837061  
DATED : March 28, 2017  
INVENTOR(S) : Veldandi et al.

Page 1 of 1

It is certified that error appears in the above-identified patent and that said Letters Patent is hereby corrected as shown below:

On the Title Page

Item (72), In "Inventors", Line 1, "Veldandi Muninder" should read --Muninder Veldandi--.

In the Claims

Column 15,
Lines 54-55, "determine" should read --determining--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*